GEORGE. M. PETERS
Improvement in Adjustable Metallic Dashers for Vehicles.
No. 4,408.
Reissued May 30, 1871.
Fig, 1.
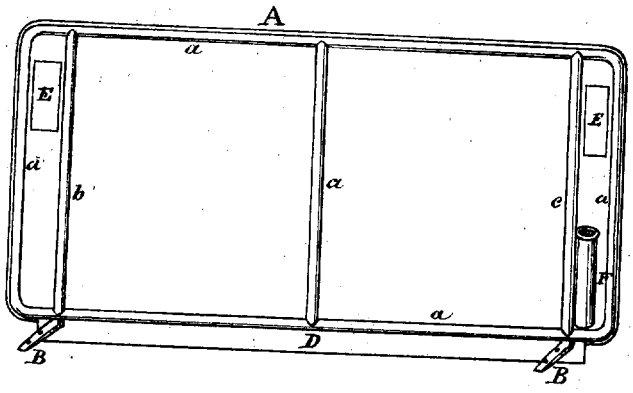
Fig, 2.
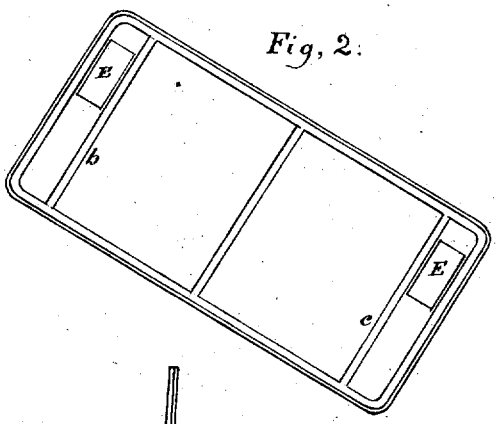
Fig, 3.
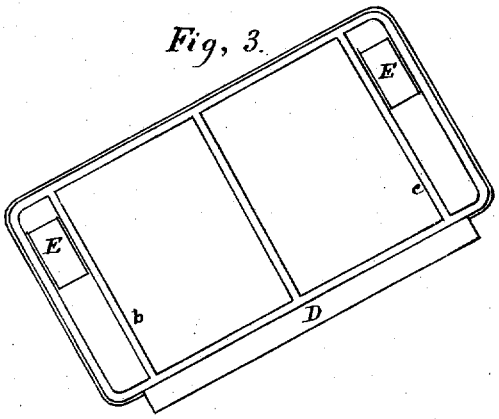
Fig, 4.
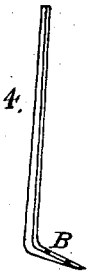
Fig, 5.
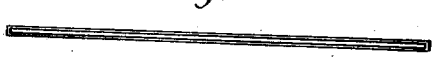
Fig, 6.
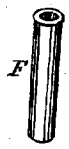
Witnesses,
Andrew McFall
N. A. Daniels
George M. Peters, Inventor
by C. S. Whitman, Att'y
AM. PHOTO-LITHOGRAPHIC CO. N.Y. (OSBORNE'S PROCESS.)

UNITED STATES PATENT OFFICE.

GEORGE M. PETERS, OF COLUMBUS, OHIO.

IMPROVEMENT IN ADJUSTABLE METALLIC DASHES FOR VEHICLES.

Specification forming part of Letters Patent No. 102,315, dated April 26, 1870; reissue No. 4,408, dated May 30, 1871.

*To all whom it may concern:*

Be it known that I, GEORGE M. PETERS, of Columbus, in the county of Franklin and State of Ohio, have invented an Improvement in Metallic Dashes for Vehicles; and do hereby declare that the following description, taken in connection with the accompanying drawing, forms a full and exact specification of the same, wherein I have set forth the nature and principles of my said improvement, by which my invention may be distinguished from others of a similar class, together with such parts as I claim and desire to secure by Letters Patent.

My invention relates to that class of vehicles in which dash-boards are used; and the nature thereof consists, first, in a movable metallic dash, constructed of sheet metal of any kind; second, in an adjustable dash-foot, constructed so that the dash can be attached to or detached from it; third, in stiffening sheet metal for dashes by raising or stamping moldings on the same.

In the accompanying drawing forming a part of this specification, Figure 1 is a perspective view of dash. Figs. 2 and 3 are longitudinal sections. Figs. 4, 5, and 6 are detached views, showing parts in detail.

In the drawing referred to herein, letter A represents a dash, as constructed of sheet metal, the same being formed with two sheets, as shown in the figures.

The moldings represented by the letters *a*, *b*, and *c* are to stiffen as well as ornament the metal, and are formed by pressing the sheet metal in a die forming grooves or concaves on the inner sides of the metal sheet.

When constructed of two sheets, the outside edges are rolled or turned over in the form of a hem by a machine, firmly binding the two sheets together, and the half moldings, which are pressed in each sheet when put together, form a full molding on the outside, and in appearance resemble the iron frame in leather dashers, but are really a complete tube, which is very stiff and light.

B B represent the dash-feet, the upper parts of which are made in any desirable form, and pass upward in the grooves or ribs *b* and *c*, furnishing a sufficient support to the dash, and being fastened to the same as may be necessary, by small screws or bolts. The lower end of the foot may be either finished or left as a rough shank, to be afterward forged to fit any shaped vehicle.

One of the peculiar advantages of this novel invention is, that dashes can now be manufactured extensively by machinery and fitted to every shaped vehicle, because the foot is made a separate part, and can be detached from the dash and heated and forged without any danger of burning the finely-polished metal or leather, or whatever the dash may be finished with.

Doubtless the reason they have not thus been manufactured by machinery is that the foot having been a permanent part of the dash, as heretofore made, of course a different-shaped dash would have to be made for every different-shaped vehicle, and as the number of shapes is endless it would be impracticable, and as the shape of every vehicle could not be known when forming the foot part of the dash, it would not fit the body unless afterward heated and forged, which would burn the covering or finish of the dash; hence the value of the adjustable foot and dash is apparent, for by this mode dashes can be made and finished, and the foot any time afterward detached to heat and forge it, and then secured to the dash permanently or otherwise, as desired.

Another great advantage is that instead of following the universal practice of those who have attempted the improvement of metal dashes by riveting sheet metal to an iron frame when the constant vibrating motion of the thin sheet metal would work itself loose and rattle, I can dispense with the heavy expensive iron frame by the moldings, which can never work loose and rattle, and are much cheaper.

What I claim, and desire to secure by Letters Patent, is—

1. The adjustable metallic dash for vehicles, with moldings raised or pressed into it in the form and for the purpose of stiffening it, as described.

2. The adjustable foot, when applied to a dash.

GEORGE M. PETERS.

Witnesses:

OSCAR G. PETERS,

CHARLES A. PEARCE.